Patented June 17, 1952

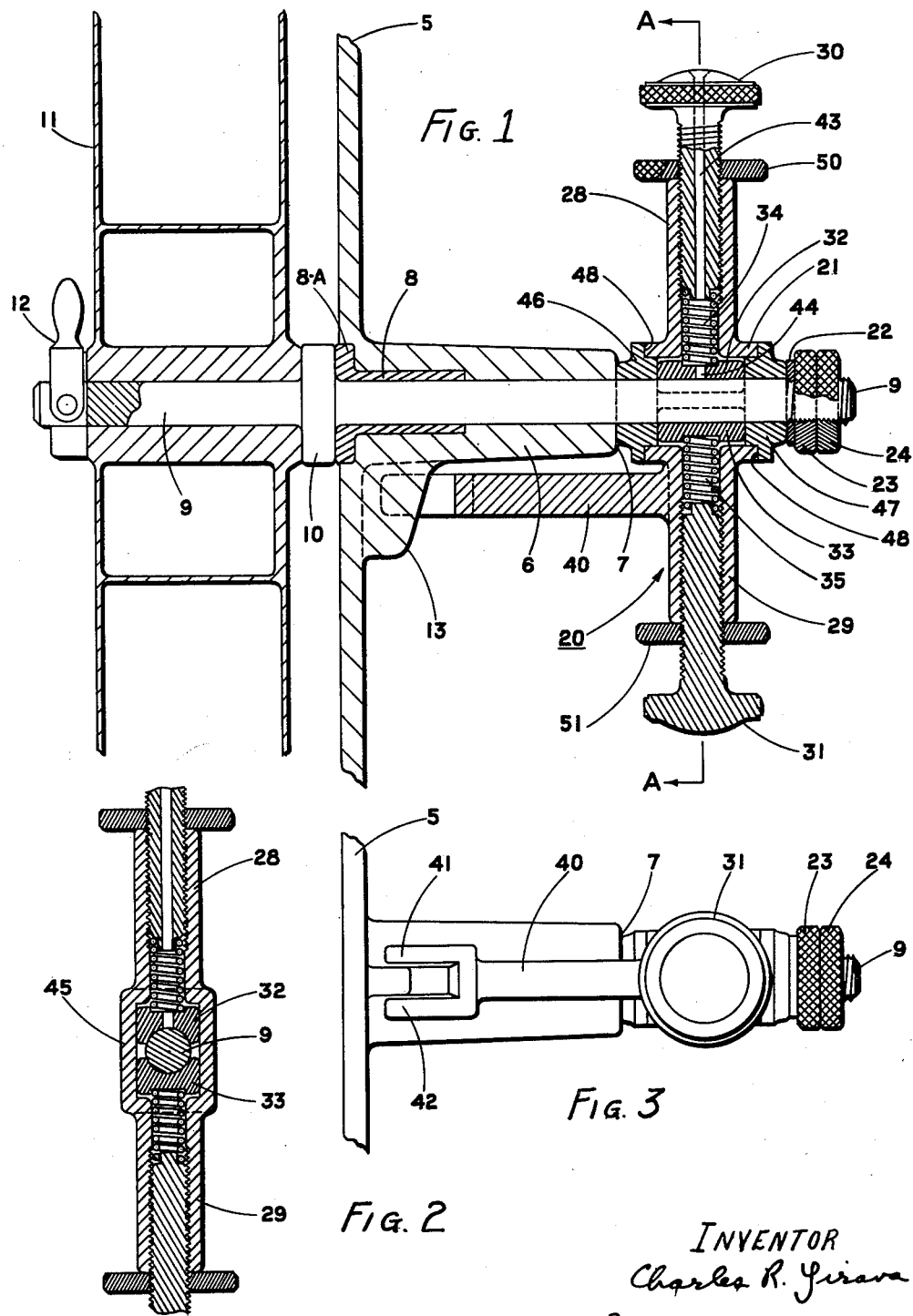

2,600,601

UNITED STATES PATENT OFFICE 2,600,601

TENSIONING DEVICE FOR FILM REEL SHAFTS

Charles R. Yirava, Cleveland, Ohio, assignor of fifty per cent to E. Donaldson, Cleveland, Ohio; Martha Yirava, administratrix of said Charles R. Yirava, deceased Application May 10, 1949, Serial No. 92,303

1 Claim. (Cl. 242—156)

This invention pertains to a tensioning or braking device for the rotating shaft of a film reel.

In the moving picture industry, projectionists have long been bothered by existing mechanisms for applying a slight tensioning or braking force to the film supply reel when a picture is being projected. The film reel is mounted in a housing and a bearing for the shaft of the reel is provided extending through the side wall of the housing. As the film is projected, the film stored on the supply reel would, in the absence of a tensioning device, tend to over-run the takeup reel, resulting in damage to the film. In the past, means have been provided for applying a slight braking force to the shaft upon which the film supply reel is mounted. The prior art device has not been entirely satisfactory in that it is hard to adjust the tension and to maintain it in substantially exact adjustment. If too much braking force is applied, the film drive sprocket is apt to tear the film. If too little tension is applied, the supply reel is apt to over-run the take-up and drive mechanisms, with the result that film is apt to spill on the floor of the housing and damage may result.

An object of the present invention is to provide a tensioning device for a movie film supply reel which can readily be applied to substantially all existing commercial movie projection equipment.

It is an object of this invention to provide a tensioning device which is easily adjustable over a rather wide range of tensional forces.

Another object of this invention is to provide a tensioning device for film supply reels which maintains its adjustment over relatively long periods of time.

A further object of this invention is to provide an inexpensive, rugged, and dependable film tensioning device.

Another object of this invention is to provide a tensioning device for a supply reel of a movie projection device which is simple in its construction, needs little or no maintenance, and which has few parts to wear or get out of order.

For a better understanding of the present invention, together with other and further objects thereof, reference is had to the following description taken in connection with the accompanying drawings, and its scope will be pointed out in the appended claim.

Fig. 1 of the drawing is a cross-sectional view of the film-tensioning device mounted on the shaft of a film reel;

Fig. 2 is a sectional view taken along line A—A of Fig. 1; and

Fig. 3 is a bottom view of the device shown in Fig. 1.

With reference to Fig. 1 of the drawings, the reference character 5 indicates the side wall of the housing of a movie projection apparatus. Integral with the side wall 5 is an outwardly extending heavy metal boss 6 having at its outer end a shoulder 7. The metal boss 6 is hollow and a bearing 8 is positioned within it for receiving the film reel shaft 9. The shaft 9 extends from the reel 11 within the housing 5 through the boss 6 and several inches out beyond the end of shoulder 7. An enlarged collar portion 10 is provided on the shaft 9 inside the housing 5. The collar portion 10 is adapted to bear against an enlarged bearing portion 8–A of the bearing 8 to prevent the reel 11, mounted on the shaft 9, from tilting with respect to the housing 5.

The film reel 11 is replaceably secured to the shaft 9 by means of the catch 12 which is well known in the art. The housing 5 includes an outwardly extending narrow retaining member 13 integral with or connected to it. All of the aforedescribed equipment is substantially standard in the projection machines used in the commercial movie houses.

The device, which is the subject matter of this invention for applying a fixed definite tension or braking force to the rotation of the shaft 9 as film is pulled from the reel 11, is indicated generally by the reference character 20. It fits on the end of the shaft 9 which extends beyond the shoulder 7 and it comprises a hollow brake housing 21. An opening extends completely through this housing to accommodate the film reel shaft 9. One end of the housing 21 fits snugly against the shoulder 7 of the housing portion 6. A thrust washer 22 is mounted around the shaft 9 at the other end of the housing 21 and one or more jam nuts 23, 24 are screwed onto the threaded end of the shaft 9 to firmly mount the tensioning device on the end of the shaft 9. This mounting means firmly holds the brake housing 21 against the shoulder 7 of the boss 6, and pulls the collar portion 10 of the shaft 9 firmly against the enlarged portion 8–A of the bearing 8. The brake housing 21 includes a first hollow arm 28 extending outwardly away from the shaft 9 in a direction substantially perpendicular to the axis of the reel shaft 9. The housing also includes a second substantially similar hollow arm 29 extending outwardly away from the shaft 9 in a direction perpendicular to the axis thereof. The two arms are spaced apart about 180 degrees around the shaft from each other so that their axes are substantially aligned. The inner surfaces of the hollow arms 28 and 29 are threaded, and bolts 30, 31 are threaded into the hollow arms 28 and 29, respectively. Positioned within the housing are two bearing members 32, 33. These bearing members may be comprised of bronze, "Oilite," lignum vitae, or the like. Each of the bearing members comprises a substantially solid body, the surface of which adjacent the shaft 9 is curved to engage the arcuate surface of the shaft, thereby providing a large area of contact between the bearing member and the shaft. In cross-section, as shown in Fig. 2, the bearing members are nearly rectangular so that when mounted within the housing 21 they do not rotate with the shaft 9.

Within each of the hollow arms 28, 29 there is positioned a spring 34, 35. The spring 34 is positioned between the end of the bolt 30 and the top surface of the bearing member 32, and the spring 35 is positioned between the underneath surface of the bearing member 33 and the end of the bolt 31. In this position the braking force applied to the rotating shaft 9 by the bearing members 32, 33 is readily increased by screwing the bolts 30, 31 in toward the bearing members or decreased by screwing the bolts 30, 31 away from the bearing members. Once a suitable braking force is applied to the shaft 9 it will be maintained over a long period of time because there is little or no wear on the bearing members 32, 33 and unless the bolts 30, 31 are turned, there is nothing to change the spring bias applied to the bearing members. Lock nuts 50, 51 are provided for positively holding the bolts, 30, 31, respectively.

A restraining arm 40 is connected to or is integral with the brake housing 21. It extends inwardly toward the housing 5 of the film reel 11. At its end the arm 40 is divided into two portions 41, 42 which straddle the retaining member 13 of the housing 5. The restraining arm 40 prevents the tensioning device 20 from rotating as the film reel shaft 9 rotates.

The tensioning device may be readily lubricated. The bolt 30, which preferably extends upwardly from the shaft 9, is hollow as is shown at 43. The end of the hole through the bolt 30 is aligned with the axis of the hollow spring 34 and the bearing member 32 has an opening 44 from the end of the spring 34 to the shaft 9. Oil which is put in at the top of the bolt 30 readily passes down to the bearing member 32 and due to the rotation of the shaft 9 to the bearing member 33.

The tensioning mechanism shown is particularly adapted for use on film projection equipment which has already been installed in movie houses. For this reason it is constructed so that it may readily be assembled onto any film reel shaft which extends out from the housing around the film reels.

The brake housing 21 is comprised, as best shown in Fig. 2, of the two hollow arm portions 28, 29 and the substantially rectangular (in cross-section) central housing portion 45. First and second housing end portions 46 and 47 are provided. Each has a central opening through which the film reel shaft 9 extends, and each has an inner shoulder 48 engages the lip of the central housing portion to substantially seal the housing shut. By maintaining sufficiently close manufacturing tolerances the joint between the central housing portion 45 and the ends 46, 47 is close enough that when the jam nuts 23, 24 hold the device in place no oil will leak out of the housing. By this construction the device is readily assembled or disassembled. When the jam nuts 23, 24 and the thrust washer 22 are removed, the housing end 47 readily comes away from the central portion 45 of housing. The piece comprised of the hollow arms 28, 29 and the central portion 45 then come away from the housing end 46 and from the shaft 9.

While the device illustrated is readily taken apart, it is to be understood that the unit is adapted to be made integral with the film reel mechanism when it is desirable to manufacture and install the reel drive mechanism and the braking or tensioning device as a unit.

While there have been described what are at present considered to be the preferred embodiments of this invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

In a tensioning device for the revolving shaft of a film reel, a brake housing having an opening extending into it and within which the shaft of said reel is adapted to be positioned, said housing including a hollow arm extending in a direction substantially perpendicular to the axis of said reel shaft; means for securing said housing to said reel shaft; movable brake shoe means within said housing adapted to engage the curved side face of said reel shaft and having an oil hole extending through it in a direction substantially perpendicular to the axis of said reel shaft; a coiled spring mounted within said hollow arm and in engagement with said brake shoe means with the hollow central portion thereof substantially aligned with the oil hole in said brake shoe; and spring pressure regulating means adjustably secured to said hollow arm and in engagement with said spring and having through it an oil hole from the outside communicating with the hollow central portion of said spring.

CHARLES R. YIRAVA.

REFERENCES CITED

The following references are of record in the file of this patent:

UNITED STATES PATENTS

| Number | Name | Date |
|---|---|---|
| 921,628 | Platter | May 11, 1909 |
| 1,345,190 | Hutchison | June 29, 1920 |
| 1,348,293 | Wenderhold | Aug. 3, 1920 |
| 1,627,370 | Bayer | May 3, 1927 |
| 1,850,755 | Kindelmann | Mar. 22, 1932 |
| 2,021,886 | Carpenter | Nov. 26, 1935 |
| 2,142,582 | Wright | Jan. 3, 1939 |
| 2,232,966 | Peterson | Feb. 25, 1941 |